United States Patent
Yang

(10) Patent No.: US 8,125,932 B2
(45) Date of Patent: *Feb. 28, 2012

(54) METHOD AND APPARATUS FOR CONTINUOUSLY RECEIVING IMAGES FROM A PLURALITY OF VIDEO CHANNELS AND FOR ALTERNATELY CONTINUOUSLY TRANSMITTING TO EACH OF A PLURALITY OF PARTICIPANTS IN A VIDEO CONFERENCE INDIVIDUAL IMAGES CONTAINING INFORMATION CONCERNING EACH OF SAID VIDEO CHANNELS

(75) Inventor: Chih-Lung Yang, Gilbert, AZ (US)

(73) Assignee: Exedra Technologies, LLC, Gilbert, AZ (US)

( * ) Notice: Subject to any disclaimer, the term of this patent is extended or adjusted under 35 U.S.C. 154(b) by 847 days.

This patent is subject to a terminal disclaimer.

(21) Appl. No.: 11/219,442

(22) Filed: Sep. 2, 2005

(65) Prior Publication Data
US 2005/0286444 A1 Dec. 29, 2005

Related U.S. Application Data

(63) Continuation of application No. 10/212,831, filed on Aug. 5, 2002, now abandoned, which is a continuation-in-part of application No. 09/906,459, filed on Jul. 16, 2001, now Pat. No. 6,535,240.

(51) Int. Cl.
*H04L 12/16* (2006.01)
*H04N 7/14* (2006.01)
(52) U.S. Cl. ............. 370/260; 370/352; 348/14.09; 348/14.13

(58) Field of Classification Search .................. None
See application file for complete search history.

(56) References Cited

U.S. PATENT DOCUMENTS

| 4,609,941 | A | * | 9/1986 | Carr et al. ............... 375/240.12 |
| 5,003,532 | A | | 3/1991 | Ashida et al. |
| 5,440,683 | A | | 8/1995 | Nally et al. |
| 5,453,780 | A | | 9/1995 | Chen et al. ............... 348/14.11 |
| 5,548,324 | A | | 8/1996 | Downs et al. |
| 5,671,377 | A | | 9/1997 | Bleidt et al. |

(Continued)

FOREIGN PATENT DOCUMENTS

EP 0523299 1/1993

(Continued)

OTHER PUBLICATIONS

Da-Jin Shiu et al., "A DCT-Domain H.263 Based Video Combiner for Multipoint Continuous Presence Video Conferencing", Multimedia Computing and Systems, 1999, IEEE International Conference on Florence, Italy Jun. 7-11, 1999(Jun. 7, 1999), pp. 77-81, XP010519359 ISBN: 0-7695-0253-9.

(Continued)

*Primary Examiner* — Steven H Nguyen
(74) *Attorney, Agent, or Firm* — Christoper P. Maiorana, PC

(57) ABSTRACT

A method and apparatus is provided for video conferencing. The method and apparatus continuously receive frames from a plurality of video channels and alternately continuously transmit to each of a plurality of participants in a video conference individual frames containing information concerning each of the video channels. The method and apparatus only transmits at any given instant new picture data for one of the participants in the video conference.

16 Claims, 10 Drawing Sheets

U.S. PATENT DOCUMENTS

| | | | |
|---|---|---|---|
| 5,691,768 A | 11/1997 | Civanlar et al. | |
| 5,764,277 A | 6/1998 | Loui et al. | 348/14.01 |
| 5,903,563 A | 5/1999 | Rashid et al. | |
| 5,953,050 A * | 9/1999 | Kamata et al. | 348/14.09 |
| 5,963,547 A | 10/1999 | O'Neil et al. | 370/260 |
| 6,128,649 A | 10/2000 | Smith et al. | |
| 6,141,062 A | 10/2000 | Hall et al. | |
| 6,147,695 A | 11/2000 | Bowen et al. | |
| 6,195,116 B1 | 2/2001 | Lee | |
| 6,198,500 B1 | 3/2001 | Watanabe et al. | |
| 6,236,760 B1 * | 5/2001 | Bagni et al. | 382/248 |
| 6,285,661 B1 * | 9/2001 | Zhu et al. | 370/260 |
| 6,288,740 B1 | 9/2001 | Lai et al. | 348/14.09 |
| 6,300,973 B1 | 10/2001 | Feder et al. | 348/14.09 |
| 6,584,077 B1 | 6/2003 | Polomski | 370/263 |
| 6,606,112 B1 * | 8/2003 | Falco | 348/14.12 |
| 7,006,576 B1 * | 2/2006 | Hannuksela | 375/240.27 |
| 7,245,660 B2 * | 7/2007 | Yona et al. | 375/240.13 |

FOREIGN PATENT DOCUMENTS

| | | |
|---|---|---|
| EP | 11041756 | 10/2000 |
| WO | WO99/35660 | 7/1999 |
| WO | WO00/13147 | 3/2000 |
| WO | WO00/74373 | 12/2000 |
| WO | WO01/22735 | 3/2001 |

OTHER PUBLICATIONS

Sun, M-T et al., "A Coded-Domain Video Combiner for Multipoint Continuous Presence Video Conference", IEEE Transactions on Circuits and Systems for Video Technology, IEEE Inc., New York, US, vol. 7, No. 6, Dec. 1, 1997 (Dec. 1, 1997), pp. 855-863, XP000729341 ISSN: 1051-8215.

Shaw-Min Lei et al., "Video Bridging Based on H.261 Standard", IEEE Transactions on Circuits and Systems for Video Technology, vol. 4, No. 4, Aug. 1994, IEEE Inc. New York, US, pp. 425-436, XP000464656.

Chia-Wen Lin et al., "Dynamic Rate Control in Multipoint Video Transcoding", IEEE International Symposium on Circuits and Systems, May 28-31, 2000, pp. II-17 through II-20, XP010502649.

Han Yona, Method and Apparatus for Mixing of Compressed Video, Dec. 4, 2001, US PTO, US 60337121, pp. 1-40.

Yona, et al., Method and an Apparatus for Mixing Compressed Video, Pub. Jul. 3, 2003, US-2003/0123537.

* cited by examiner

14A

14B

14C

14D

H.261

QCIF picture

CIF picture

H.261

QCIF picture

CIF picture

Picture B needs to change it's group number

Picture C needs to change it's group number

Picture D needs to change it's group number

I picture

| Intra MBs | Not COD |
|---|---|
| Not COD | Not COD |

P picture

P picture

| Inter MBs | Not COD |
|---|---|
| Not COD | Not COD |

P picture

When the QCIF picture is put into the CIF picture structure, its Group Numbers (GN) need to change to the corresponding GN of the CIF picture. For example, if the QCIF picture is put to the lower right corner, then GN 1 should change to 8, 3 to 10 and 5 to 12.

| 1 | 2 |
|---|---|
| 3 | 4 |
| 5 | 6 |
| 7 | 8 |
| 9 | 10 |
| 11 | 12 |

Group Number of CIF picture

| 1 |
|---|
| 3 |
| 5 |

Group Number of QCIF picture

METHOD AND APPARATUS FOR CONTINUOUSLY RECEIVING IMAGES FROM A PLURALITY OF VIDEO CHANNELS AND FOR ALTERNATELY CONTINUOUSLY TRANSMITTING TO EACH OF A PLURALITY OF PARTICIPANTS IN A VIDEO CONFERENCE INDIVIDUAL IMAGES CONTAINING INFORMATION CONCERNING EACH OF SAID VIDEO CHANNELS

This is a continuation of U.S. Ser. No. 10/212,831, filed Aug. 5, 2002 now abandoned, which is a continuation-in-part of U.S. Ser. No. 09/906,459, filed Jul. 16, 2001, now U.S. Pat. No. 6,535,240.

FIELD OF THE INVENTION

This invention relates to video conferencing. More particularly, the invention relates to a method and apparatus for video conferencing which significantly simplifies and reduces the expense of video conferencing equipment which continuously receives a video signal from each of two or more participants, combines the video signals into a single composite video signal, and retransmits to each of the participants the composite video signal so that each participant can view simultaneously himself or herself on a video screen along with the other participants.

In a further respect, the invention relates to a method and apparatus for video conferencing which receives a video signal from a participant and alters the headers and coded domain data, if necessary, in the signal without altering, in whole or in part, the pixel domain data which defines the picture transmitted with the signal.

In another respect, the invention relates to a method and apparatus for video conferencing which transmits to participants only the new information in one video channel at a time.

BACKGROUND OF THE INVENTION

Video conferencing permits two or more participants to communicate both verbally and visually. The use of equipment which permits video conferencing has experienced only moderate growth in recent years because of cost, bandwidth limits, compatibility problems, and the limited advantages inherent in face-to-face meetings as compared to the traditional audio conference accomplished via telephone.

Many commercially available video conferencing systems, including those video units which use the H.320, H.323 and H.324 envelope-protocols for call set up, call control plus audio and video coding-decoding or codec formats (H.320 is the protocols for ISDN network, H.323 for the LAN network and H.324 for the standard phone or POTS connections), only provide point-to-point video conferencing. To involve these point-to-point video conferencing systems in a multi-point video conferencing requires the use of an MCU (multi-point control or conference unit). A MCU can operate either in a switched presence mode or continuous presence mode. In switched presence mode, only one video stream is selected and transmitted to all the participants based either on the audio signal or "chairman" switch control. In continuous presence mode, the MCU receives component video signals from each participant in a video conference and combines the signals to produce a single composite signal, and sends the composite signal back to each participant, see FIG. 1. The composite signal enables each participant to view on one screen the pictures of the other participants along with his or her own picture on a real time basis using a split-screen. The sophisticated structure and large computation power of an MCU presently ordinarily require that it resides on a central server. Some providers of MCU systems claim that their MCU software can be operated on a desktop personal computer (PC). However, such MCU systems apparently support only the switched presence multi-point operation or they produce video streams in proprietary formats which require each participant to install special video conferencing software or apparatus.

Some of the factors that have made conventional MCU systems complicated follow:

1. The H.263 codec format permits the continuous presence mode. In the continuous presence mode, an MCU receives 4 video streams from the participants, makes some headers changes, and send them back without combining them. The computer or other apparatus of each participant need to decode and display all four video streams to see the pictures of all the participants. The H.261 codec format does not, however, permit the continuous presence mode. The H.261 is the required codec format for the H.323 video unit. H.263 is an optional codec format. In addition, some existing systems that run H.263 do not support the continuous presence mode which is optional in H.263.
2. Most existing video conferencing systems provide only point-to-point video conferencing.
3. An MCU system can provide continuous presence multi-point video conferencing only if it can combine several incoming video streams into a single composite outgoing video stream that can be decoded by the equipment which receives the outgoing video stream.
4. When an MCU system combines several incoming video streams, difficulties arise:
    a. Incoming streams may use different codec formats, e.g., H261 or H.263.
    b. Even if incoming streams have the same codec format, they may have different picture types, e.g., I picture or P picture.
    c. Even if incoming streams have the same codec format and the same picture type, they each may have or utilize different quantizers. This makes the adjustment of the DCT coefficients necessary and at the same time introduces errors.
    d. Video frames in each of the video channels ordinarily arrive at different times. When the MCU awaits the arrival of a frame or frames from each video channel, a time delay results.
    e. If the MCU waits for the arrival of a frame or frames from each video channel, operation of the MCU is, in substance, controlled by the channel with the slowest frame rate.
    f. An existing technique for solving the non-synchronized frame rate problem mentioned above is to substitute the slower channels with the previous images, so that the faster channel are updated while the slower ones remain the same. But this practice takes a significant amount of memory for buffering the images and it may mean each image has to be fully decoded and encoded.

Accordingly, it would be highly desirable to provide an improved video conferencing system which could, in essence, provide continuous presence multi-point video conferencing while avoiding some or all of the various problems in prior art MCU systems.

Therefore, it is an object of the present invention to provide an improved video conferencing system. A further object of the invention is to provide an improved method and apparatus for providing a continuous presence multi-point video conferencing system.

Another object of the invention is to provide an improved continuous presence multi-point video conferencing system which significantly simplifies and reduces the expense of existing multi-point video conferencing systems.

BRIEF DESCRIPTION OF THE DRAWINGS

These, and other and further and more specific objects of the invention will be apparent to those skilled in the art based on the following description, taken in conjunction with the drawings, in which:

FIG. 5 illustrates the information contained in a composite CIF video stream produced from an incoming QCIF I picture and an incoming QCIF P picture using the H.263 codec format;

FIG. 6 is a diagram illustrating how the group number (GN) in an incoming QCIF frame may be changed when the QCIF frame coded in H.261 is incorporated in an outgoing composite CIF video stream coded in H.261;

SUMMARY OF THE INVENTION

Figure 1:
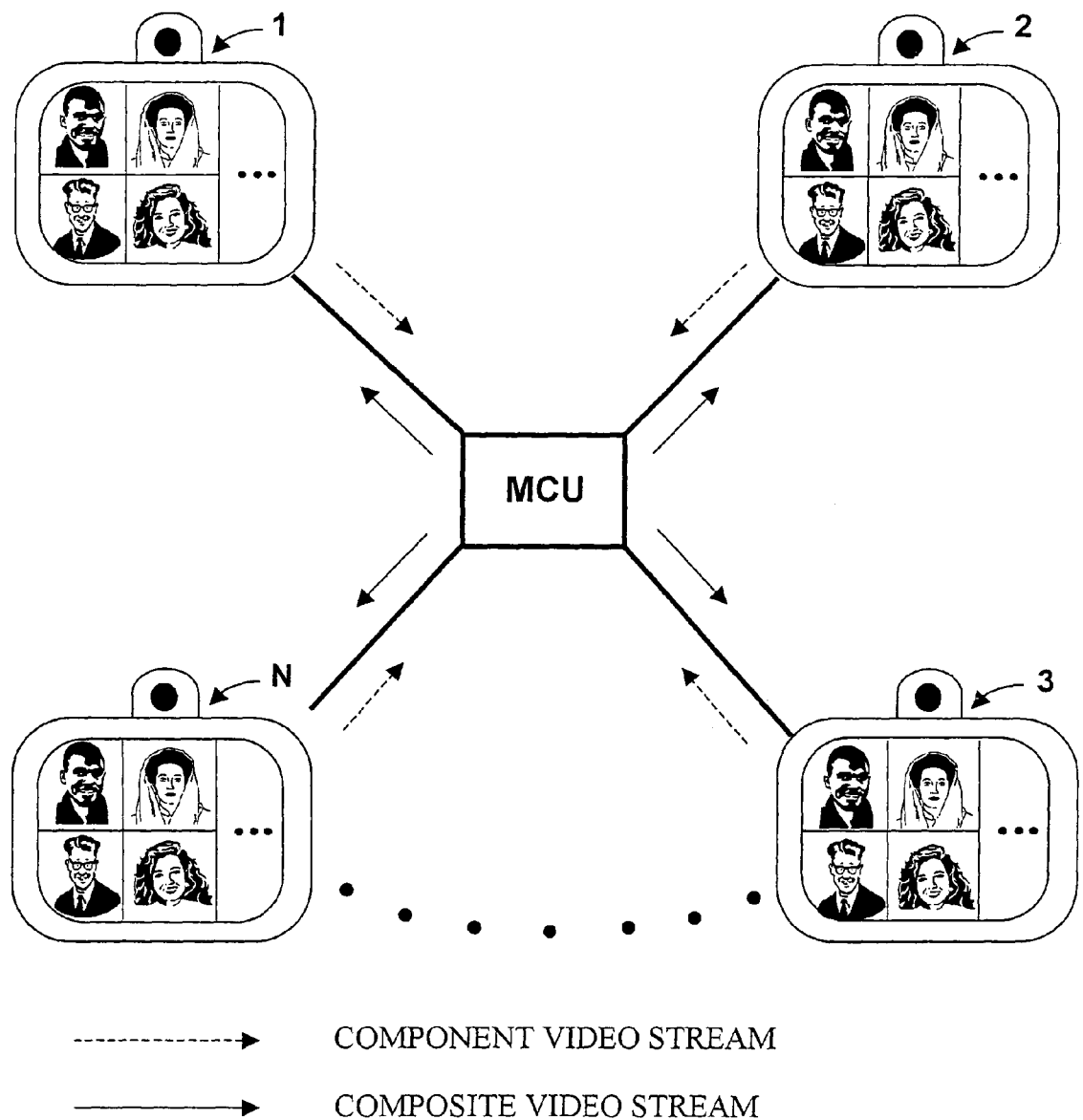
FIG. 1 is a diagram illustrating the relationship between an MCU and video sources in a multi-point, continuous presence video conferencing system.

The current invention can be implemented in either line switching networks or packet switching networks. In a packet switching network, video data are segmented into packets before they are shipped through the network. A packet is an individual object that travels through the network and contains one or a fraction of a picture frame. The header of each packet provides information about that packet, such as if it contains the end of a frame. With this end-of-frame packet and the previous packets, if it applies, the MCU gets all the data for a new picture frame. Therefore, a MCU can tell if a new frame is received in a video channel just by reading the packet header. Also, at the very beginning of a video conference, before any video packet can be sent, there is a call setup process which checks each participant's capabilities, such as what kind of video codec is used, what kind of audio codec is used. Once the call setup is done, each video channel carries a video stream only in a certain standard codec format, i.e. H.261 or H.263.

Briefly, in accordance with the invention, we provide an improved method for receiving frames from at least first and second incoming video channels and for alternately continuously transmitting individual frames in at least a first outgoing video stream to a first equipment apparatus for receiving the first video stream and generating a video image including pictures from both of the incoming video channels, and a second outgoing video stream to a second equipment apparatus for receiving the second video stream and generating a video image including pictures from both of the incoming video channels. The method including the steps of matching the codec format of the new frame, when there is a new frame available, to that of at least the first equipment apparatus; generating, after matching the codec format of the new frame to that of the first equipment apparatus, a revised frame by altering at least one header and coded domain data, if necessary, in the available frame according to a selected picture format; generating steady state data which indicates that there is no change in the picture for the video channel which does not provide any new frame; combining the revised frame produced and the steady state data produced to generate a composite video signal in the first outgoing video stream. The first equipment apparatus receives the composite video signal and produces a video image including a picture, from one of the channels, generated from the revised frame and including a picture, from the remaining channel, which exists prior to receipt of the composite video signal by the first equipment apparatus and which, based on the steady state data in the video signal, remains unchanged.

In another embodiment of the invention, we provide an improved apparatus for receiving frames from at least first and second incoming video channels and for alternately continuously transmitting individual frames in at least a first outgoing video stream to a first equipment apparatus for receiving the first video stream and generating a video image including pictures from both of the incoming video channels, and a second outgoing video stream to a second equipment apparatus for receiving the second video stream and generating a video image including pictures from both of the incoming video channels. The improved apparatus includes apparatus, when there is a new frame available, to match the codec format of the new frame to that of at least the first equipment apparatus; apparatus to generate, after the codec format of the new frame is matched to that of the first equipment apparatus, a revised frame by altering at least one header and coded domain data, if necessary, in the new frame according to a selected picture format; apparatus to generate steady state data which indicates that there is no change in the picture for the video channel which does not provide any new frame; apparatus to combine the revised frame and the steady state data to generate a composite video signal in the first outgoing video stream. The first equipment apparatus receives the composite video signal and produces a video image including a picture, from one of the channels, generated from the revised frame in the video signal, and including a picture from the other channel which exists prior to receipt of the composite video signal by the first equipment apparatus and which, based on the steady state data in the video signal, remains unchanged.

In a further embodiment of the invention, we provide an improved method for receiving and transmitting video data across a network. The method comprises the steps of receiving a call initialization signal further comprising a codec identifying signal that corresponds to a codec format, in a network interface from a first video source; storing the codec identifying signal in a memory; receiving a component video packet stream from the first video source; disassembling the component video packet stream into a component video signal; forming a composite video signal from the component video signal, the composite video signal further comprising the codec format; assembling the composite video signal into a composite video packet stream further comprising the codec format; and, transmitting the composite video packet stream to the first video source. If, within a certain time frame, the component video packet stream is received as a video packet stream for an image, then the component video packet stream from the first video source is received. The method can comprise the additional steps of receiving a second call initialization signal further comprising a second codec identifying signal that corresponds to a second codec format, in the network interface from a second video source; storing the second codec identifying signal in the memory; receiving a second component video packet stream from the second video source; disassembling the second component video packet stream into a second component video signal; forming a second composite video signal from the second component video signal, the second composite video signal further comprising the codec format; assembling the second composite video signal into a second composite video packet stream further comprising the codec format; forming a third composite video signal from the second component video signal, the third composite video signal further comprising the second codec format; assembling the third composite video signal into a third composite video packet stream further comprising the second codec format; transmitting the second composite video packet stream to the first video source; and, transmitting the third composite video packet stream to the second video source.

In still another embodiment of the invention, we provide an improved apparatus for receiving and transmitting video data across a network. The apparatus includes a video processing unit. The video processing unit further comprises a network interface for receiving a call initialization signal from a video source, the call initialization signal further comprising a codec format, for receiving a component video packet stream from the video source, and for transmitting a composite video packet stream to the video source; a memory further comprising a call set-up algorithm for identifying the codec format of the call initialization signal and storing the codec format in the memory; a packet driver for disassembling the component video packet stream into a component video signal and for assembling a composite video signal into a composite video packet stream; and, a multi-point control unit for revising the component video signal into the composite video signal. The packet driver is coupled to the multi-point control unit, the memory and the network interface. The multi-point control unit is coupled to the memory. The component video packet stream is a video packet stream for an image. If desired, the network interface can receive a second call initialization signal from a second video source. The second call initialization signal further comprises a second codec format such that the call setup algorithm identifies the second codec format and stores the second codec format in the memory. Further, if desired, the multi-point control unit can sequentially sense whether a second component video packet stream has been received at the network interface from the second video source whereby upon receipt of the second component packet stream the packet driver disassembles the second component video packet stream into a second component video signal, the multi-point control unit revises the second component video signal into a second composite video signal in the codec format and the second component video signal into a third composite video signal in the second codec format such that the packet driver assembles the second composite video signal into a second composite video packet stream in the codec format and the third composite video signal into a third composite video packet stream in the second codec format such that the network interface transmits the second composite video packet stream in the codec format to the video source and the network interface transmits the third composite video packet stream in the second codec format to the second video source. If desired, the network interface can have the capability to connect to a plurality of video sources such that each of the plurality of video sources transmits a component video packet stream further comprising a corresponding codec format, such that the network interface receives the plurality of component video packet streams from the plurality of video sources and transmits a composite video packet stream to each of the plurality of video sources in the same corresponding codec format comprised in the component video packet streams transmitted from the plurality of video sources.

In still a further embodiment of the invention, we provide a method for receiving and transmitting video data across a network. The method comprises the steps of receiving a video signal from a first video source, the signal further comprising a codec identifying signal that corresponds to a first codec format; receiving a second video signal from a second video source, the second signal further comprising a codec identifying signal that corresponds to a second codec format different from the first codec format; forming a composite video signal from the first and second signals, the composite video signal further comprising the first codec format; assembling the composite video signal into a composite video packet stream further comprising the first codec format; and, transmitting the composite video packet stream to the first video source.

In yet another embodiment of the invention, we provide an improved method for receiving and transmitting video data across a network comprising the steps of receiving a call initialization signal in a network interface from a first video source; receiving a call initialization signal in the network interface from a second video source; receiving a component packet stream from the first video source; disassembling the component video packet stream into a component video signal; forming a composite video signal from the component video signal, the composite video signal further comprising steady state data for the second video source; assembling the composite video signal into a composite video packet stream; and, transmitting the composite video packet stream to the second video source.

In yet a further embodiment of the invention, we provide an improved apparatus for receiving video data across a network. The apparatus comprises a display further comprising a screen displaying at least first and second images; a network interface for receiving a composite video packet stream further comprising coded domain data to revise the first image and steady state data indicating that the second image is unchanged; a packet driver for disassembling the composite video packet stream into a composite video signal including the steady state data and the coded domain data; and, a control unit to revise the first image in the display with the coded domain data and, based on the steady state data, to permit the second image to remain unchanged in the display.

In still yet another embodiment of the invention, we provide an improved apparatus for receiving video data across a network. The apparatus includes a display further comprising a screen displaying at least first and second images; a network interface for receiving a composite video packet stream further comprising coded domain data to revise the first image; a packet driver for disassembling the composite video packet stream into a composite video signal including the coded domain data; and, a control unit to receive the composite video signal and revise only the first image in the display with the coded domain data.

In still yet a further embodiment of the invention, we provide an improved apparatus for receiving and transmitting video data across a network. The apparatus comprises a video processing unit. The video processing unit further comprises a network interface. The interface receives a call initialization signal from a video source, the call initialization signal further comprising a codec format; receives a component video packet stream from the video source; receives a call initialization signal from a second video source, the call initialization signal further comprising a second codec format; and, transmits a composite video packet stream. The video processing unit also includes a packet driver coupled to the network interface for disassembling the component video packet stream into a component video signal and for assembling a composite video signal into a composite video packet stream; a memory coupled to the packet driver and further comprising a call set-up algorithm for identifying the codec formats of the call initialization signals and storing the codec formats in the memory; and, a multi-point control unit coupled to the packet driver and the memory for revising the component video signal into the composite video signal, the composite video signal further comprising steady state data for the second video source. The first and second codec formats can be identical or different from one another.

DETAILED DESCRIPTION OF THE PREFERRED EMBODIMENTS

Turning now to the drawings, which describe the presently preferred embodiments of the invention for the purpose of describing the operation and use thereof and not by way of limitation of the scope of the invention, and in which like reference characters refer to corresponding elements throughout the several views, the following terms and definitions therefore as utilized herein.

Assemble. Take digital data from a video signal and organize data into packets for transmission across a network.

Block. A block is the fourth hierarchical layer in video syntax. Data for a block consists of code words for transform coefficients. The size of a block is 8 by 8. This term is used in both H.261 and H.263 codec formats.

Call set-up. A process executed at the very beginning of a video conference, before any packet containing video pixel data is sent, to determine the capabilities of each participant's video equipment, such as the codec used by the video equipment.

Chrominance. The difference determined by quantitative measurements between a color and a chosen reference color of the same luminous intensity, the reference color having a specified color quality. This term is used in connection with H.261, H.263, and other codec formats.

CIF. CIF stands for common intermediate format. CIF is a picture format which has, for luminance, 352 pixels per horizontal line and 288 lines, and has, for chrominance, 176 pixels per horizontal line and 144 lines. CIF indicates the size of a digital picture that appear on the display of a participant's video equipment. CIF presently is used in connection with most codec formats.

COD. COD stands for coded macroblock indication and is used in connection with the H.263 codec format. A COD is one data bit in the header of a macroblock (MB) in an INTER picture. If the data bit is set to "1", no further information is transmitted. In other words, the picture associated with and defined by this macroblock does not change on the participant's screen and remains the same.

Codec format. A format for coding and decoding digitized video data.

Coded domain data. This is coded compressed picture data. In the presently preferred embodiment of the invention the MCU receives coded domain QCIF data and sends coded domain CIF data. This term is used in connection with H.261, H.263, and other codec formats. Coded domain data includes pixel domain data and headers for the layers of a video frame. Coded domain data, as used herein, does not include either data defining codec format or picture size format (i.e., CIF, QCIF, or comparable formats).

Component video signal. A video signal sent from the video equipment of one of the participants in a video conference to the MCU of the invention. This signal includes digital data defining a sequential series of frames. The digital data for each frame comprises video syntax. Video syntax includes headers and pixel domain data, and, can, if desired, include other data.

Component video packet stream. A packet stream containing the data in the component video signal.

Composite video signal. A video signal sent from the MCU of the invention to the video equipment of one or more of the participants in a video conference. The composite video signal is generated from a component video signal(s) by altering the headers in the component video signal that define codec format and picture size format (i.e., QCIF, etc.) and, if necessary, altering the headers in the coded domain data and, if necessary, all or a portion of the pixel domain data in the coded domain data in the incoming component video signal. The pixel domain data in the component video signal ordinarily is only altered by rearranging the pixel domain data. While it is possible that a portion of the pixel domain data can be decoded, it is a principal object and advantage of the invention that decoding of the pixel domain data is avoided during formation of the composite video signal. The pixel domain data used to form a composite video signal defines an image. If the image only corresponds to a portion of a display picture, then when the video equipment of a participant receives the composite video signal, it uses the image to update only a portion of the display picture shown on the participant's CRT or other display.

Composite video packet stream. A packet stream containing the data in a composite video signal.

Computer. A functional unit that can perform substantial computations, including numerous arithmetic operations and logic operations without human intervention during a run. In information processing, the term computer usually describes a digital computer. A computer may consist of a stand-alone unit or may consist of several interconnected units.

Computer system. A functional unit, consisting of one or more computers and associated software, that uses common storage for all or part of a program and also for all or part of the data necessary for the execution of the program; executes user-written or user-designated programs; performs user-designated data manipulation, including arithmetic operations and logic operations; and that can execute programs that modify themselves during their execution. A computer system may be a stand-alone unit or may consist of several interconnected units.

CPBY. CPBY stands for coded block pattern for luminance and is used in connection with the H.263 codec format. A CPBY is a variable length code word in the header of a macroblock (MB) which describes data in the macroblock.

DCT. DCT stands for discrete cosine transformation. This transformation is used to compress data and to eliminate unnecessary information. DCT is used by the coding device of the participant. This term is used in connection with H.261, H.263 and other codec formats.

Digital picture. A digital picture is a frame. The digital data defining a frame is called video syntax. Video syntax includes headers and pixel domain data. The pixel domain data defines the display picture that appears on the CRT or other display of a participant's video conference equipment.

Digital video signal. Digital data defining an image and including a codec format and other pertinent information.

Disassemble. To take the data in packets and produce a video signal.

Display picture. The picture that appears on the CRT or other screen or display in a participant's video conference equipment as defined by pixel domain data.

Frame. A frame is one digital picture in a sequential series of pictures in a video channel or other video stream. This term is used in connection with H.261, H.263, and other codec formats.

Frame rate. The frame rate is the rate in frames per second that an MCU receives a sequential series of frames. The frame rate currently typically is about thirty frames per second. This term is used in connection with H.261, H.263, and other codec formats.

GOB. GOB stands for group of blocks. A GOB is the second hierarchical layer in video syntax. This term is used in connection with the H.261 and H.263 codec formats.

GN. GN stands for group of block number. A GN consists of 4 bits in H.261's header and 5 bits in H.263's header for a group of blocks. Only the GN in the H.261 header is used in the practice of the invention. The data bits indicate the position of the group of blocks in a picture, i.e., upper left, upper right, lower left, lower right.

Header (or header file). A header is information included at the beginning of a picture, group of blocks, macroblock or block of information. The header describes the information which follow the header. This term is used in connection with the H.261 and H.263 codec formats and other codec formats.

Horizontal component. The horizontal component is the pixels along a horizontal line. This term is used in connection with the H.261 and H.263 codec formats and other codec formats.

H.261 codec format. A standard format for coding and decoding digitized video data. The format is provided by ITU-T.

H.263 codec format. A standard format for coding and decoding digitized video data. The format is provided by ITU-T.

IDCT. IDCT stands for inverse discrete cosine transformation. The IDCT is used to reverse or decode the DCT. This term is used in connection with the H.261 and H.263 codec formats.

Image. An image is one digital picture, more than one digital picture, or a portion of a digital picture in a composite video packet stream. Ordinarily, a composite video packet stream received by a participant's video conference equipment will contain the video syntax defining a frame and will contain pixel domain data pertaining to the entire display picture. It is, however, possible for a composite video packet stream to contain digital data defining or altering only a portion of the display picture. It is also possible for an MCU to receive from two separate sources digital data (i.e., to receive two or more frames) pertaining to one display picture, and to combine such digital data during the process of preparing the composite video signal. Accordingly, the composite video signal and composite video packet stream contain digital data defining an image, which image can comprise one digital picture, more than one digital picture (combined to define digital data defining a particular display picture), or a portion of a digital picture.

Interface. Hardware, software, or both that links systems, programs, or devices.

INTRA. This is an I-picture. An INTRA is a picture or a macroblock type that has no reference picture(s) for prediction purposes. This term is used in connection with the H.263 codec format.

INTER. This is a P-picture. An INTER is a picture or a macroblock type that has a temporally previous reference video data. This term is used in connection with the H.263 codec format.

Layer. A layer is one level of hierarchy in video syntax, comprising a quantity of digitized data or information.

Lower layer. A lower layer is a layer in video syntax which is a part of an upper layer and is lower than the picture layer. This term is used in connection with the H.261, H.263, and other codec formats.

Luminance. Luminance is the luminous intensity of a surface in a given direction per unit of projected area. This term is used in connection with the H.261, H.263, and other codec formats.

Macroblock. A macroblock (MB) is digital data or information. A MB includes blocks and a header. This term is used in connection with the H.261 and H.263 codec formats.

Mapping. Mapping is modifying headers and coded domain data, if necessary, in the video syntax for a H.261 or H.263 QCIF frame so that the QCIF frame looks like a H.261 or H.263 CIF frame with the QCIF data in one quarter (or some other portion) of the CIF frame area. Although mapping changes or alters headers and other information such as the coded domain data, it ordinarily does not change the portions of the signal which define the pixels comprising the picture of a participant that is produced on the participant's screen of video equipment. This term is used in connection with the H.261 and H.263 codec formats.

MB. MB stands for macroblock, which is defined above.

MBA. MBA stands for macroblock address. The MBA is a variable length code word in the header of a MB that indicates the position of the MB within a group of blocks. This term is used in connection with the H.261 codec format.

MCBPC. MCBPC indicates of the macroblock type and coded block pattern for chrominance, and consist of a variable length code word in the header of a MB. This terms is used in connection with the H.263 codec format.

MCU. MCU stands for multi-point control (or conference) unit. A conventional MCU can operate either in a switched presence format or in a continuous presence format. In the switched presence format, the MCU receives video bit-streams from more than one participant, selects only one of the video bit-streams and transmits it simultaneously to each participant in a video conference. In the continuous presence format, the MCU receive video bit-streams from more than one participant, and simultaneously transmits each stream in a split screen format to each participant in the video conference. The MCU utilized in the practice of the invention at any instant in time only transmits one image of an incoming video signal plus some steady state data added to the image to facilitate retransmission of the image data to participants in a video conference. This term is used in connection with the H.261, H.263, and other codec formats.

Memory. The addressable storage space in a processing unit and other internal storages that is used to execute instructions.

MVD. MVD stands for motion vector data. An MVD is a variable length code word in the header of a macroblock for the horizontal component followed by a variable length code word for the vertical component. This term is used in connection with the H.263 codec format.

Network. Techniques, physical connections, and computer programs used to link two or more computers. Network users are able to share files, printers, and other resources; send electronics messages; and run programs on other computers.

Network interface. A component in a computer system for exchanging digital data between that system and other computer systems in a network.

NOT COD. NOT COD means the COD is set to "1". This term is used in connection with the H.263 codec format.

Non-reference picture. A non-reference picture is a skipped picture frame that is received from a participant by the MCU and is skipped and not retransmitted by the MCU. A non-reference picture frame ordinarily is not retransmitted because it is identical, or nearly identical, to the frame which was just previously transmitted by the MCU. This term is used in connection with the H.261 and H.263 codec formats.

Packet. A basic unit of data transferred over a network such as the Internet. A message to be transferred over the network is broken up into small units, or packets, by the sending computer system. The packets, which travel independently of one another, are marked with the sender's address, destination address, and other pertinent information, including data about any errors introduced during transfer. When the packets arrive at the receiving computer, they are reassembled.

Packet driver. A device or software program for disassembling a packet video stream into a digital video signal and for assembling a digital video signal into a packet video stream.

Packet video stream. Digital data from a video signal assembled into packets for transmission across a network.

Picture. A picture is the first hierarchical layer in video syntax. The information included in a picture is a header file plus the GOB. The information includes the picture size format (QCIF, CIF, etc.) information. This term is used in connection with the H.261 and H.263 codec formats and other codec formats.

Point-to-point function. In a point-to-point function video conferencing system, only two participants are involved. Such a system allows the first person's picture to be sent to the second person or vice-versa. The video of the first person is not combined with the video of another person before it is sent to the second person.

QCIF. QCIF stands for quarter-common intermediate format. QCIF is a picture format which has, for luminance, 176 pixels per horizontal line and 144 lines, and has, for chrominance, 88 pixels per horizontal line and 72 lines. QCIF presently is used in connection with most codec formats.

Quantizer. A quantizer is data that indicates the accuracy of the picture data.

Steady state data. Data in a composite video signal that indicates that there is no change in a display picture for a specified area of a recipient's CRT or other display.

TR. Temporal reference. As used in connection with the H.263 codec format, the TR comprises eight bits of data in the header of a picture layer. This data is produced by incrementing its value in the temporally previous reference picture header by one plus the number of skipped or non-reference pictures at the picture clock frequency since the previously transmitted picture. As used in connection with the H.261 codec format, this TR comprises five bits of data in the header of a picture layer and is data that is produced by incrementing its value in the temporally previous reference picture header by one plus the number of skipped or non-reference pictures at the picture clock frequency since the previously transmitted picture.

Video channel. A path along which video signals can be sent.

Video signal. Data from a video source. The data can comprise a call initialization signal, a component video signal, a composite video signal, codec format, picture size information, a component video packet stream, a composite video packet stream, and/or other pertinent information.

Video syntax. Video syntax is digitized data that describes and defines a video frame. Video syntax is a defined arrangement of information contained in a video frame. The information is arranged in a hierarchical structure which has four layers:

Picture
Group of blocks (GOB)
Macroblocks (MB)
Blocks

Each layer includes a header file.

In the following description of the presently preferred embodiments of the invention, it is assumed that there are four participants in a video conference and that each participant has video conferencing equipment which generates video signals comprising a video channel which is received by a MCU constructed in accordance with the invention. As would be appreciated by those of skill in the art, the apparatus and method of the invention can be utilized when there are two or more participants in a video conference. The method and apparatus of the invention ordinarily are utilized when there are three or more participants in a video conference.

In the video conferencing system of the invention, the MCU generates an outgoing composite CIF signal. The MCU divides the outgoing composite CIF signal into orthogonal quarters, namely, an upper left quarter, an upper right quarter, a lower left quarter, and a lower right quarter. Each incoming channel from a participant comprises a component QCIF signal. Each channel is assigned to one of the orthogonal quarters of the outgoing composite CIF signal. When a frame arrives at the MCU in one of the channels, the frame is assigned by the MCU to the orthogonal quarter of the outgoing composite CIF signal that is reserved or selected for that channel.

Figure 2:
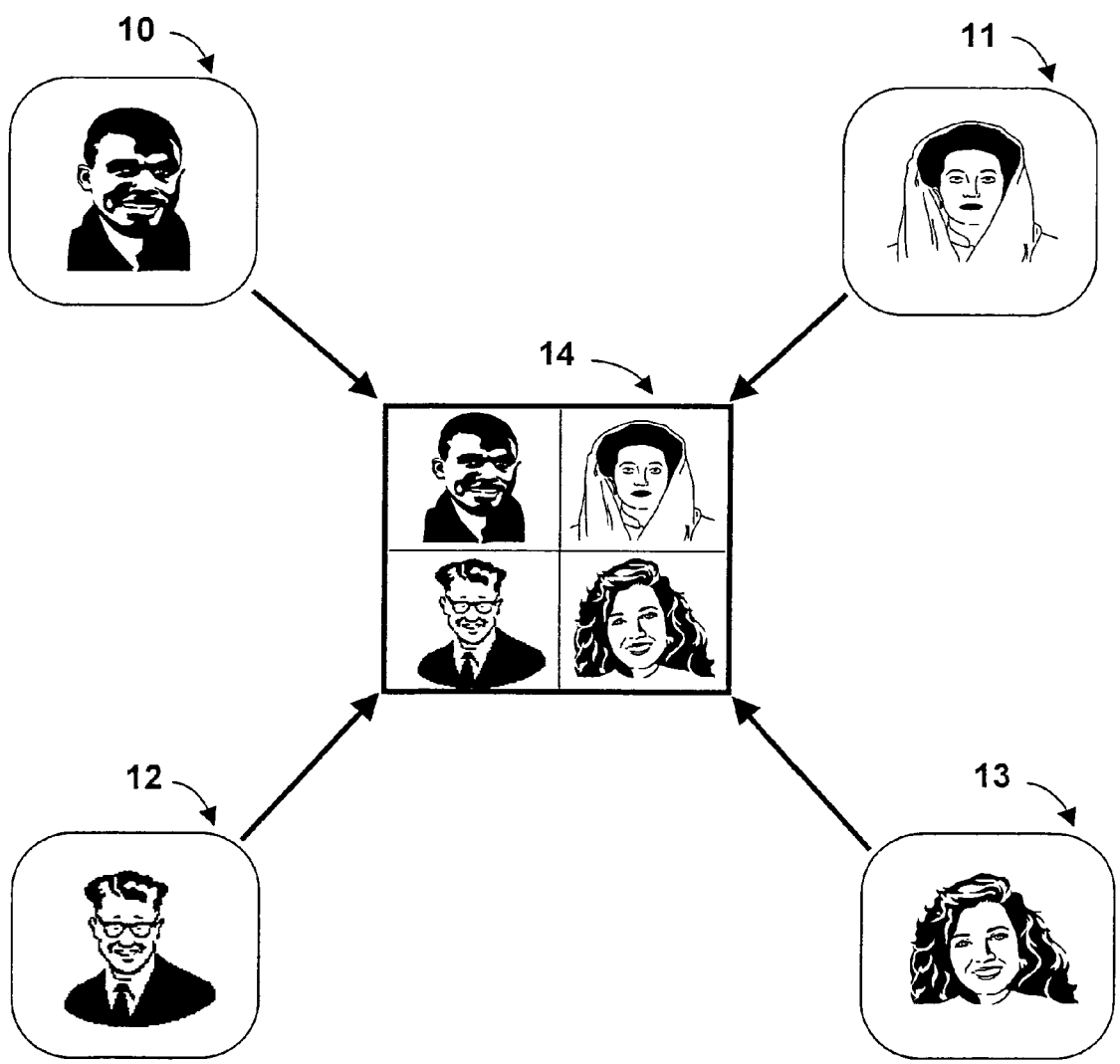
FIG. 2 is a diagram illustrating the screen of a participant in a video conferencing system constructed in accordance with the invention.

It is understood that a variety of codec formats exist or will be developed and can be incorporated into the invention. However, for the following discussion it is assumed that the video equipment utilized by each participant in a video conference utilizes either the H.261 or H.263 codec format. And, more specifically, it is assumed that the incoming component signal 10 (from the first participant) is in the H.261 codec format and that incoming component signals 11 (from the second participant), 12 (from the third participant), 13 (from the fourth participant) in FIG. 2 are in the H.263 codec format. This means that the outgoing composite signal 14 (FIG. 2) produced by the MCU for the first participant will be in the H.261 codec format and that the outgoing composite signal 14 produced by the MCU for the second, third, and fourth participants will be in the H.263 codec format.

Since the MCU is, at any instant, basically updating only one-quarter of the outgoing composite CIF signal, the structure of the MCU of the invention is, in comparison to conventional MCUs, simplified, and, the computation power required to operate the MCU of the invention is, in comparison to conventional MCUs, significantly reduced. Also, since the MCU of the invention works, in contrast to conventional MCUs, only on coded domain data, the MCU of the invention requires only small amount of memory. This reduction in complexity, computation power, and memory size enables the practice of the invention to be employed in any existing point-to-point video conferencing equipment, such as personal computers, 2.5G/3G video mobile phones, notebook computers, personal digital assistants (PDA), game consoles, etc., without any additional support from a central server.

As noted above, for sake of this example, it is assumed that there are four participants in a video conference. The video equipment of the first participant produces a channel comprising an incoming component QCIF signal 10. The video equipment of the second participant produces a channel comprising an incoming component QCIF signal 11. The video equipment of the third participant produces a channel comprising an incoming component QCIF signal 12. The video equipment of the fourth participant produces a channel comprising an incoming component QCIF signal 13. The camera, computer, CRT or other video screen, and other video equipment used by each participant to produce a channel comprising a QCIF signal is well known in the art and will not be described in detail herein.

The MCU receives the incoming component QCIF signals 10, 11, 12, 13 and combines them into an outgoing composite CIF signal 14. Please see FIG. 2. Each component QCIF signal comprises a stream of digital frames or pictures. Digital frames in component QCIF signal 10 are utilized to update the upper left quadrant of an outgoing composite CIF signal 14. Digital frames in component QCIF signal 11 are utilized to update the upper right quadrant of an outgoing composite CIF signal 14. Digital frames in component QCIF signal 12 are utilized to update the lower left quadrant of an outgoing composite CIF signal 14. Digital frames in component QCIF signal 13 are utilized to update the lower right quadrant of an outgoing composite CIF signal 14. Each time a new composite CIF signal 14 is generated by the MCU, in the presently preferred embodiment of the invention, the new signal contains information which basically only changes the picture in one quadrant of the CIF signal. As would be appreciated by those of skill in the art, it is possible in accordance with the invention to configure the MCU such that each time a new composite CIF signal 14 is generated, the picture in two or more quadrants of the CIF signal are changed. Also, it is possible in accordance with the invention to configure the MCU such that each time a new composite CIF signal 14 is generated, only a portion of the picture in a quadrant of the CIF signal is changed. But in the presently preferred embodiment of the invention, only the picture in one quadrant of the CIF signal is changed each time a new composite CIF signal is generated by the MCU.

As would be appreciated by those of skill in the art, each incoming channel can comprise a component sub-QCIF signal, and the outgoing composite signal can be a composite CIF signal which contains 6 sub-QCIF pictures plus some empty space. Or, each incoming channel can comprise a component CIF signal and the outgoing signal can be a composite 4CIF signal. Or, each incoming channel can comprise a component 4CIF signal and the outgoing signal can be a composite 16CIF signal, etc. Or, other standardized or non-standardized picture formats can be adopted. In the continuous presence mode of H.263, at most 4 video signals can be transmitted. This is in direct contrast to the capability of some possible embodiments of the invention in which, for example, four CIF pictures, each containing four QCIF pictures, can add up to one composite 4CIF picture containing the pictures of sixteen participants. Also, pictures of different sizes can be accommodated in the invention. For example, an outgoing composite 4CIF signal can contain two incoming CIF signals in its upper left and upper right quadrants while its lower left and lower right quadrants can contains eight QCIF signals.

It is understood that one component signal 10 may transmit new frames or pictures to the MCU at a higher or slower rate than component signals 11, 12, 13. This does not alter operation of the MCU, because the MCU basically operates on a first-come, first-serve basis. E.g., as soon as the MCU receives an image from a component signal 10 to 13, it processes that particular image and generates and transmits a composite CIF signal 14 to the video equipment of each of the participants. As would be appreciated by those of skill in the art, the MCU can, if desired, process every other frame, every third frame, or other designated intermittent frames. The MCU then processes the next frame it receives and generates and transmits a composite CIF signal 14 to the video equipment of each of the participants, and so on. Since the equipment of one of the participants utilizes the H.261 codec format and the equipment of the remaining participants utilizes the H.263 codec format, each time the MCU receives and processes a frame via one of component signals 10 to 13, the MCU generates both a composite CIF signal 14 in the H.261 codec format and a composite CIF signal 14 in the H.263 codec format.

If an incoming component QCIF signal 10 is in the H.261 codec format and the outgoing composite CIF signal is in the H.263 format, a frame from the signal 10 is converted from the H.261 codec format to the H.263 codec format when the MCU is generating an outgoing composite signal 14 in the H.263 codec format. Similarly, if an incoming component QCIF signal 11 to 13 is in the H.263 codec format and the outgoing composite CIF sign is in the H.261 codec format, a frame from the component signal 11 to 13 is converted from the H.263 codec format to the H.261 codec format when the MCU is generating an outgoing composite signal 14 in the H.261 codec format.

Part I of Example: Composite CIF Signal Transmitted in H.263 Codec Format.

In this part of the example, it is assumed that the MCU is processing incoming component signals 10 to 13 to produce an outgoing composite signal 14 which is in the H.263 codec format, which outgoing composite signal 14 will be sent to the second, third, and fourth participants identified above.

The MCU monitors the incoming component signals 10 to 13 and waits to receive a new frame from one of component signals 10 to 13. Component signal 10 is the first signal to transmit a new QCIF frame to the MCU. The MCU alters the headers and coded domain data of the QCIF frame to change the frame from an H.261 codec format to the H.263 codec format. The altered headers indicate that the frame is an INTER picture (i.e., is a P picture). The MCU retains the digital data (i.e., the pixel domain data) in the frame which defines the video picture of the first participant. Although the digital data which defines the video picture of the first participant may be rearranged by the MCU, the video picture which results is unchanged, or is substantially unchanged, by the MCU.

Figure 3:
FIG. 3 is a diagram illustrating the information contained in the outgoing composite H.263 video stream when the upper left quadrant of the video image is being changed, when the upper right quadrant of the video image is being changed, when the lower left quadrant of the video image is being changed, and when the lower right quadrant of the video image is being changed.
Figure 3:
Figure 3:
Figure 3:

The MCU prepares outgoing composite CIF signal 14A depicted in FIG. 3. First, a CIF picture header which has a picture type of CIF and a picture coding type of INTER (P picture) is generated. Then, a proper temporal reference is assigned to the picture. The temporal reference indicates the number of non-transmitted pictures. Therefore, the temporal reference is incremented by 1 for each picture. The H.263 codec format includes a frame skipping feature which presently is not utilized in the practice of the invention.

Since frames received from component QCIF signal 10 have been assigned to the upper left quadrant of an outgoing composite CIF signal 14, the MCU inserts in the upper left quadrant of the outgoing composite CIF signal 14A the QCIF frame produced by the MCU by converting the QCIF picture it receives via component signal 10 from the H.261 codec format to the H.263 codec format. Since the new QCIF frame is in the upper left quadrant, each GOB data in the QCIF frame, from top to bottom, goes through necessary MVD modifications since it may refers to different MVD in the CIF picture. After each GOB goes through the necessary MVD modifications, it links up with eleven MB headers for the upper right quadrant (each of which is assigned the bit "1" to designate NOT COD) and becomes a new CIF GOB. Each of the MB headers for the lower left and lower right quadrants is filled with the bit "1" to designate NOT COD.

The resulting outgoing composite CIF signal 14A is illustrated in FIG. 3. When this composite signal is transmitted and is received by participants two, three, and four, the video equipment of these participants inserts the picture illustrated in the upper left quadrant in 14A in the upper left quadrant of the video picture shown on each of the participant's CRTs or other screens. The pictures shown on the CRTs or other screens in the remaining quadrants remain unchanged.

The MCU transmits composite CIF signal 14A to participants two, three, and four.

After transmitting composite CIF signal 14A, the MCU again monitors the incoming component signals 10 to 13 in a round-robin fashion. Component signal 11 is checked to see if it contains a new frame. If component signal 11 does not contain a new frame, MCU moves on and checks if channel 12 contains a new frame and so on. If component signal 11 contains a new frame, the following procedure will be followed.

Since the frame is already in the H.263 codec format, it is not necessary to change the frame from the H.261 codec format to the H.263 codec format.

This frame is found to be an INTRA picture (I picture). The MCU converts it into an INTER or P picture, see FIG. 5. At the macro block level, MB Type is set to INTRA or INTRA+Q if a quantizer is modified, and COD is added. MCBPC is transferred from the table for the I picture to the table for the P picture. CBPY takes the complement of its original value. This procedure for changing the headers and rearrangement of the coded domain data, if necessary, to indicate an INTER picture is well known by those of ordinary skill in the art.

The MCU prepares outgoing composite CIF signal 14B depicted in FIG. 3. First, a CIF picture header which has a picture type of CIF and a picture coding type of INTER (P picture) is generated. Then, a proper temporal reference is assigned to the picture. The temporal reference indicates the number of non-transmitted pictures. The temporal reference is incremented by 1 for each picture in the method of the invention. The H.263 codec format includes a frame skipping feature which presently is not utilized in the practice of the invention.

Since frames received from component QCIF signal 11 have been assigned to the upper right quadrant of an outgoing composite CIF signal 14, the MCU inserts in the upper right quadrant of the outgoing composite CIF signal 14B the QCIF frame produced by the MCU by converting the QCIF I picture it receives via component signal 11 into a QCIF P picture, both in H.263 codec format. Since the QCIF frame is in the upper right quadrant, every GOB data in the QCIF frame, from top to bottom, goes through necessary MVD modifications since it refers to different MVD in the CIF picture. After each GOB goes through the necessary MVD modifications, it links up with eleven MB headers for the upper left quadrant (each of which is assigned the bit "1" to designate NOT COD) and becomes a new CIF GOB. Each of the MB headers for the lower left and lower right quadrants is filled with the bit "1" to designate NOT COD.

The resulting outgoing composite CIF signal 14B is illustrated in FIG. 3. When this signal is transmitted and is received by participants two, three, and four, the video equipment of these participants inserts the picture illustrated in the upper right quadrant of composite CIF signal 14B in the upper right quadrant of the video picture shown on each of the participant's CRTs or other screens. The pictures shown on the CRTs or other screens in the remaining quadrants remain unchanged.

The MCU transmits composite CIF signal 14B to participants two, three, and four.

The MCU again monitors the incoming component signals 10 to 13 for a new incoming frame in a round-robin fashion. The MCU receives a new frame from component signal 12.

Since the frame received from component signal 12 is already in the H.263 codec format, it is not necessary to change the frame from the H.261 codec format to the H.263 codec format.

This frame is found to be an INTER picture (P picture). Therefore, the MCU does not need to convert it into P picture format.

The MCU prepares outgoing composite CIF signal 14C depicted in FIG. 3. First, a CIF picture header which has a picture type of CIF and a picture coding type of INTER (P picture) is generated, see FIG. 5. Then, a proper temporal reference is assigned to the picture. The temporal reference indicates the number of non-transmitted pictures. The temporal reference is incremented by 1 for each picture in the method of the invention. The H.263 codec format includes a frame skipping feature which presently is not utilized in the practice of the invention.

Each of the eleven MB headers for the upper left and upper right quadrants of the outgoing composite CIF signal is filled with the bit "1" to designate NOT COD. Then, since frames received from component QCIF signal 12 have been assigned to the lower left quadrant of an outgoing composite CIF signal 14, the MCU inserts in the lower left quadrant of the outgoing composite CIF signal 14C the QCIF frame received by the MCU via component signal 12. Since the QCIF frame is in the lower left quadrant, every GOB data in the QCIF frame, from top to bottom, goes through necessary MVD modifications since it refers to different MVD in the CIF picture. After each GOB goes through the necessary MVD modifications, it links up with eleven MB headers for the lower right quadrant (each of which is assigned the bit "1" to designate NOT COD) and becomes a new CIF GOB.

The resulting outgoing composite CIF signal 14C is illustrated in FIG. 3. When this signal is transmitted and is received by participants two, three, and four, the video equipment of these participants inserts the picture illustrated in the lower left quadrant of composite CIF signal 14C in the lower left quadrant of the video picture shown on each of the participant's CRTs or other screens. The pictures shown on the CRTs or other screens in the remaining quadrants remain unchanged.

The MCU transmits composite CIF signal 14C to participants two, three, and four.

The MCU again monitors the incoming component signals 10 to 13 for new incoming frame in a round-robin fashion. The MCU receives a new frame from component signal 13.

Since the frame received from component signal 13 is already in the H.263 codec format, it is not necessary to change the frame from the H.261 codec format to the H.263 codec format.

This frame is found to be an INTER picture (P picture). Therefore, the MCU does not need to convert it into P picture format.

The MCU prepares outgoing composite CIF signal 14D depicted in FIG. 3. First, a CIF picture header which has a picture type of CIF and a picture coding type of INTER (P picture) is generated, see FIG. 5. Then, a proper temporal reference is assigned to the picture. The temporal reference indicates the number of non-transmitted pictures. The temporal reference is incremented by 1 for each picture in the method of the invention. The H.263 codec format includes a frame skipping feature which presently is not utilized in the practice of the invention.

Each of the eleven MB headers for the upper left and upper right quadrants of the outgoing composite CIF signal is filled with the bit "1" to designate NOT COD. Then, since frames received from component QCIF signal 13 have been assigned to the lower right quadrant of an outgoing composite CIF signal 14, the MCU inserts in the lower right quadrant of the outgoing composite CIF signal 14D the QCIF frame received by the MCU via component signal 13. Since the QCIF frame is in the lower right quadrant, every GOB data in the QCIF frame, from top to bottom, goes through necessary MVD modifications since it refers to different MVD in the CIF picture. After each GOB goes through the necessary MVD modifications, it links up with eleven MB headers for the lower left quadrant (each of which is assigned the bit "1" to designate NOT COD) and becomes a new CIF GOB.

The resulting outgoing composite CIF signal 14D is illustrated in FIG. 3. When this signal is transmitted and is received by participants two, three, and four, the video equipment of these participants inserts the picture illustrated in the lower right quadrant of composite CIF signal 14D in the lower right quadrant of the video picture shown on each of the participant's CRTs or other screens. The pictures shown on the CRTs or other screens in the remaining quadrants remain unchanged.

The MCU transmits composite CIF signal 14D to participants two, three, and four.

Part II of Example: Composite CIF Signal Transmitted in H.261 Codec Format.

In this part of the example, it is assumed that the MCU is processing incoming component signals 10 to 13 to produce an outgoing composite signal 14 which is in the H.261 codec format, which outgoing composite signal 14 will be sent only to the first participant identified above.

The MCU again monitors the incoming component signals 10 to 13 for new incoming frame in a round-robin fashion. Let component signal 10 be the first signal to transmit a new frame 10A to the MCU. Since the frame is already in the H.261 codec format it is not necessary for the MCU to modify the frame from the H.263 codec format to the H.261 codec format.

Figure 4A:
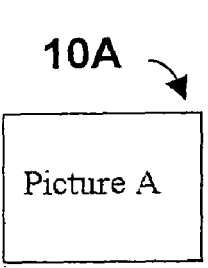
FIG. 4 is a diagram illustrating an incoming QCIF frame for the upper left quadrant of an outgoing composite H.261 CIF video stream and indicating information contained in the outgoing composite H.261 CIF video stream, illustrating an incoming QCIF frame for the upper right quadrant of an outgoing composite H.261 CIF video stream and indicating information contained in the outgoing composite H.261 CIF video stream, illustrating an incoming QCIF frame for the lower left quadrant of an outgoing composite H.261 CIF video stream and indicating information contained in the outgoing composite H.261 CIF video stream, and, illustrating an incoming QCIF frame for the lower right quadrant of an outgoing composite H.261 CIF video stream and indicating information contained in the outgoing composite H.261 CIF video stream.
Figure 4A:
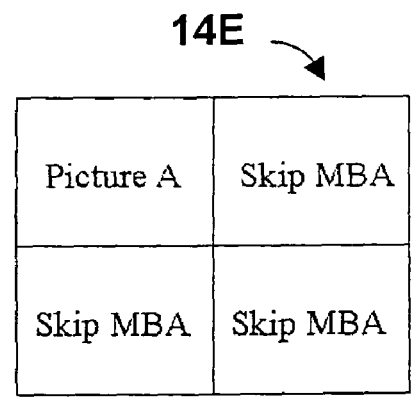
Figure 4A:
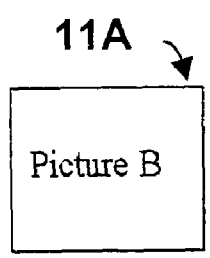
Figure 4A:
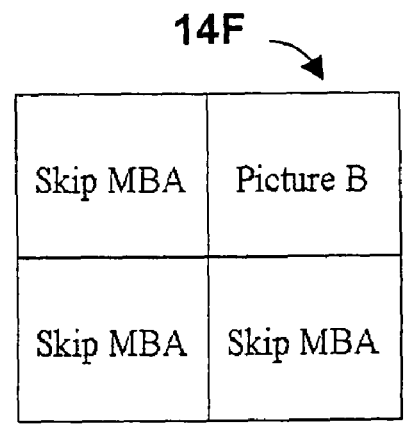

The MCU prepares outgoing composite CIF signal 14E depicted in FIG. 4A. First, a CIF picture header which has a picture type of CIF is generated. Then, a proper temporal reference is assigned to the picture.

Since frames received from component QCIF signal 10 have been assigned to the upper left quadrant of an outgoing composite CIF signal 14E, the MCU inserts in the upper left quadrant of the outgoing composite CIF signal 14E the QCIF frame received by the MCU via component signal 10. If necessary, the GNs for the QCIF frame should be altered to correspond to the GNs illustrated in FIG. 6. Since a QCIF frame in H.261 codec format has GNs 1, 3, 5 which match those of the upper left quadrant of a CIF frame in H.261 codec format, they don't need to be altered.

The MCU fills the upper right quadrant of composite signal 14E with GOB headers each containing the correct GN 2, 4, or 6, as the case may be. The headers in each GOB are not followed by any macro block data. Similarly, the MCU fills the lower left quadrant of composite CIF signal 14E with GOB headers each containing the correct GN 7, 9, or 11, as the case may be. The headers in each GOB in the lower left quadrant are not followed by any macro block data. Finally, the MCU fills the lower right quadrant of composite CIF signal 14E with GOB headers each containing the correct GN 8, 10 or 12, as the case may be. The headers in each GOB for the lower right quadrant are not followed by any macro block data. When a GOB header, with a proper GN, is not followed by any additional macro block data, Skip MBA is indicated, which means that the picture in that quadrant is not updated by a participant's video equipment when the equipment receives that particular composite CIF signal 14E.

The resulting outgoing composite CIF signal 14E is illustrated in FIG. 4A. When this signal is transmitted and is received by participant one, the video equipment of this participant inserts the picture contained in the QCIF frame in the upper left quadrant of the video picture shown on the participant's CRT or other screen. The pictures shown on the participant's CRT in the remaining quadrants remain unchanged.

After transmitting composite CIF signal 14E to the first participant, the MCU again monitors the incoming component signals 10 to 13 and waits to receive a new frame. The MCU receives a new frame 11A from component signal 11.

Since the frame is in the H.263 codec format, the MCU changes the codec format to H.261 codec format. When the H.263 codec format is changed to the H.261 codec format, it makes no difference whether the incoming picture is an I picture or a P picture. The MCU retains the digital data (i.e., the pixel domain data) in the frame which defines the video picture of the second participant. Although the digital data (pixel domain data) which defines the video picture of the second participant may be rearranged by the MCU, the video picture which results is unchanged, or is substantially unchanged, by the MCU.

The MCU prepares outgoing composite CIF signal 14F depicted in FIG. 4A. First, a CIF picture header which has a picture type of CIF is generated. Then, a proper temporal reference is assigned to the picture.

Since frames received from component QCIF signal 11A have been assigned to the upper right quadrant of an outgoing composite CIF signal 14F, the MCU inserts in the upper right quadrant of the outgoing composite CIF signal 14F the QCIF frame produced by the MCU by converting the QCIF picture it receives via component signal 11A from the H.263 codec format to the H.261 codec format. The GNs for the QCIF frame are altered to correspond to the GNs illustrated in FIG. 6. Since the QCIF frame has GNs of 1, 3 and 5, these numbers are changed to 2, 4, and 6 because the QCIF frame is inserted in the upper right quadrant of the outgoing composite CIF signal. The GNs for the upper right quadrant of the composite CIF signal 14F must, as shown in FIG. 6, be 2, 4, 6.

The MCU fills the upper left quadrant of composite signal 14F with GOB headers each containing the correct GN 1, 3, or 5, as the case may be. The headers in each GOB are not followed by any macro block data. Similarly, the MCU fills the lower left quadrant of composite CIF signal 14F with GOB headers each containing the correct GN 7, 9, or 11, as the case may be. The headers in each GOB in the lower left quadrant are not followed by any macro block data. Finally, the MCU fills the lower right quadrant of composite CIF signal 14F with GOB headers each containing the correct GN 8, 10 or 12, as the case may be. The headers in each GOB for the lower right quadrant are not followed by any macro block data. When a GOB header, with a proper GN, is not followed by any additional macro block data, Skip MBA is indicated, which means that the picture in that quadrant is not updated by a participant's video equipment when the equipment receives that particular composite CIF signal 14F.

The resulting outgoing H.261 codec format composite CIF signal 14F is illustrated in FIG. 4A. When this signal is transmitted and is received by participant one, the video equipment of this participant inserts the picture contained in the QCIF frame in the upper right quadrant of the video picture shown on the CRT or other screen of participant one. The pictures shown on the participant's CRT in the remaining quadrants remain unchanged.

After transmitting composite CIF signal 14F to the first participant, the MCU again monitors the incoming component signals 10 to 13 and waits to receive a new frame. The MCU receives a new frame 12A from component signal 12.

Since the frame is in the H.263 codec format, the MCU changes the codec format to H.261. When the H.263 codec format is changed to the H.261 codec format, it makes no difference whether the incoming picture is an I picture or a P picture. The MCU retains the digital data (i.e., the pixel domain data) in the frame which defines the video picture of the third participant. Although the digital data (pixel domain data) which defines the video picture of the third participant may be rearranged by the MCU, the video picture which results is unchanged, or is substantially unchanged, by the MCU.

Figure 4B:
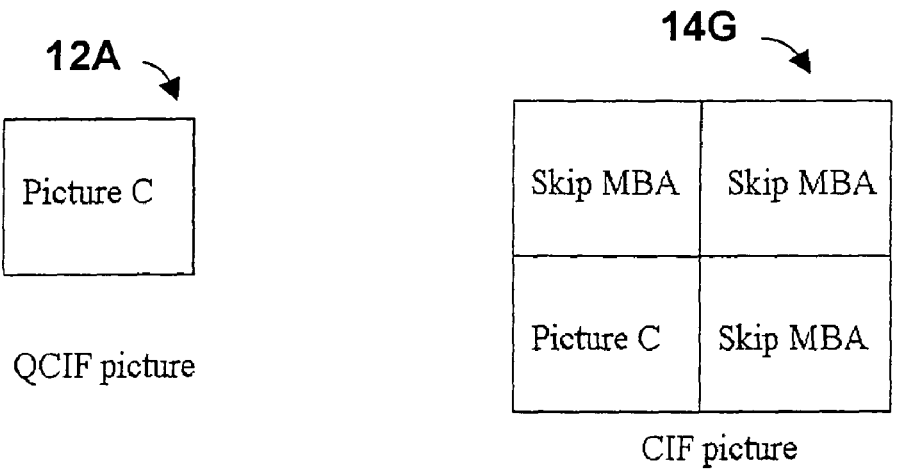
Figure 4B:
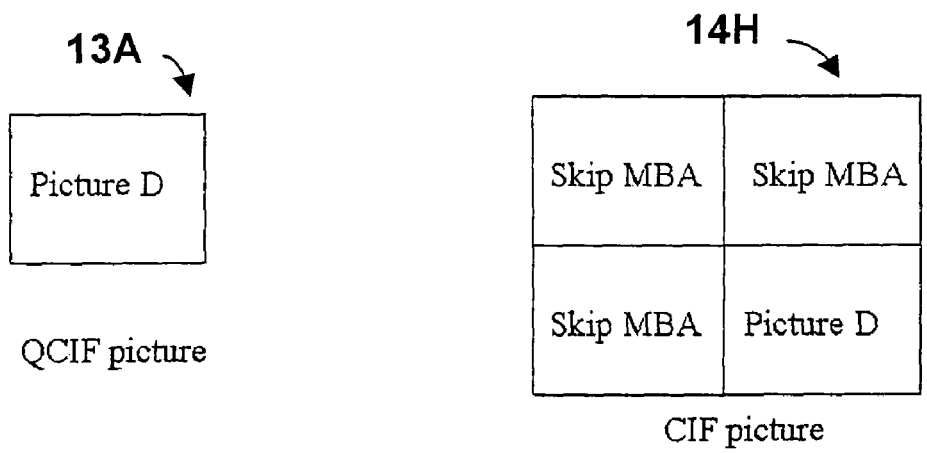

The MCU prepares outgoing composite CIF signal 14G depicted in FIG. 4B. First, a CIF picture header which has a picture type of CIF is generated. Then, a proper temporal reference is assigned to the picture.

Since frames received from component QCIF signal 12A have been assigned to the lower left quadrant of an outgoing composite CIF signal 14G, the MCU inserts in the lower left quadrant of the outgoing composite CIF signal 14G the QCIF frame produced by the MCU by converting the QCIF picture it receives via component signal 12A from the H.263 codec format to the H.261 codec format. The GNs for the QCIF frame are altered to correspond to the GNs illustrated in FIG. 6. Since the QCIF frame has default GNs of 1, 3 and 5, these numbers are changed to 7, 9, and 11 because the QCIF frame is inserted in the lower left quadrant of the outgoing composite CIF signal. The GNs for the lower left quadrant of the composite CIF signal 14G must, as shown in FIG. 6, be 7, 9, 11.

The MCU fills the upper left quadrant of composite signal 14G with GOB headers each containing the correct GN 1, 3, or 5, as the case may be. The headers in each GOB are not followed by any macro block data. Similarly, the MCU fills the upper right quadrant of composite CIF signal 14G with GOB headers each containing the correct GN 2, 4, 6, as the case may be. The headers in each GOB in the upper right quadrant are not followed by any macro block data. Finally, the MCU fills the lower right quadrant of composite CIF signal 14G with GOB headers each containing the correct GN 8, 10 or 12, as the case may be. The headers in each GOB for the lower right quadrant are not followed by any macro block data. When a GOB header, with a proper GN, is not followed by any additional macro block data, Skip MBA is indicated, which means that the picture in that quadrant is not updated by a participant's video equipment when the equipment receives that particular composite CIF signal 14G.

The resulting outgoing H.261 codec format composite CIF signal 14G is illustrated in FIG. 4B. When this signal is transmitted and is received by participant one, the video equipment of this participant inserts the picture contained in the QCIF frame in the lower left quadrant of the video picture shown on the CRT or other screen of participant one. The pictures shown on the participant's CRT in the remaining quadrants remain unchanged.

After transmitting composite CIF signal 14G to the first participant, the MCU again monitors the incoming component signals 10 to 13 and waits to receive a new frame. The MCU receives a new frame 13A from component signal 13.

Since the frame is in the H.263 codec format, the MCU changes the codec format to H.261. When the H.263 codec format is changed to the H.261 codec format, it makes no difference whether the incoming picture is an I picture or a P picture. The MCU retains the digital data (i.e., the pixel domain data) in the frame which defines the video picture of the fourth participant. Although the digital data (pixel domain data) which defines the video picture of the fourth participant may be rearranged by the MCU, the video picture which results is unchanged, or is substantially unchanged, by the MCU.

The MCU prepares outgoing composite CIF signal 14H depicted in FIG. 4B. First, a CIF picture header which has a picture type of CIF is generated. Then, a proper temporal reference is assigned to the picture.

Since frames received from component QCIF signal 13A have been assigned to the lower right quadrant of an outgoing composite CIF signal 14H, the MCU inserts in the lower right quadrant of the outgoing composite CIF signal 14H the QCIF frame produced by the MCU by converting the QCIF picture it receives via component signal 13A from the H.263 codec format to the H.261 codec format. The GNs for the QCIF frame are altered to correspond to the GNs illustrated in FIG. 6. Since the QCIF frame has GNs of 1, 3 and 5, these numbers are changed to 8, 10, and 12 because the QCIF frame is inserted in the lower right quadrant of the outgoing composite CIF signal. The GNs for the lower right quadrant of the composite CIF signal 14H must, as shown in FIG. 6, be 8, 10, 12.

The MCU fills the upper left quadrant of composite CIF signal 14H with GOB headers each containing the correct GN 1, 3, or 5, as the case may be. The headers in each GOB are not followed by any macro block data. Similarly, the MCU fills the upper right quadrant of composite CIF signal 14H with GOB headers each containing the correct GN 2, 4, 6, as the case may be. The headers in each GOB in the upper right quadrant are not followed by any macro block data. Finally, the MCU fills the lower left quadrant of composite CIF signal 14H with GOB headers each containing the correct GN 7, 9, 11, as the case may be. The headers in each GOB for the lower left quadrant are not followed by any macro block data. When a GOB header, with a proper GN, is not followed by any additional macro block data, Skip MBA is indicated, which means that the picture in that quadrant is not updated by a participant's video equipment when the equipment receives that particular composite CIF signal 14H.

The resulting outgoing H.261 codec format composite CIF signal 14H is illustrated in FIG. 4B. When this signal is transmitted and is received by participant one, the video equipment of this participant inserts the picture contained in the QCIF frame in the lower right quadrant of the video picture shown on the CRT or other screen of participant one. The pictures shown on the participant's CRT in the remaining quadrants remain unchanged.

As would be appreciated by those of skill in the art, a variety of codec formats other than H.263 and H.261 exist and can be utilized in accordance with the invention to receive and transmit only one image at a time from a plurality of incoming channels during a video conference between a plurality of participants.

The equipment needed to transmit to the MCU component QCIF (or other) signals from each participant in a video conference and to transmit composite CIF (or other) signals from the MCU to selected ones of the participants in a video conference is well known and is not described in detail herein.

Instead of transmitting in a quadrant of a CIF signal 14 a picture of a video conference participant, other information can be transmitted. For example, video clips, documents, spread sheets, presentations can be integrated into CIF signal 14 and appear, for example, in the lower right quadrant instead of a picture of one of the participants in the video conference.

FIG. 1 illustrates video sources 1, 2, 3 . . . N communicating with one another via an MCU during a video conference. As is illustrated in FIGS. 7 and 8, the MCU can be located on a server or other computer system separate from the video equipment of the participants in the video conference, or can be incorporated in the video equipment of one of the participants in the video conference.

Figure 7:
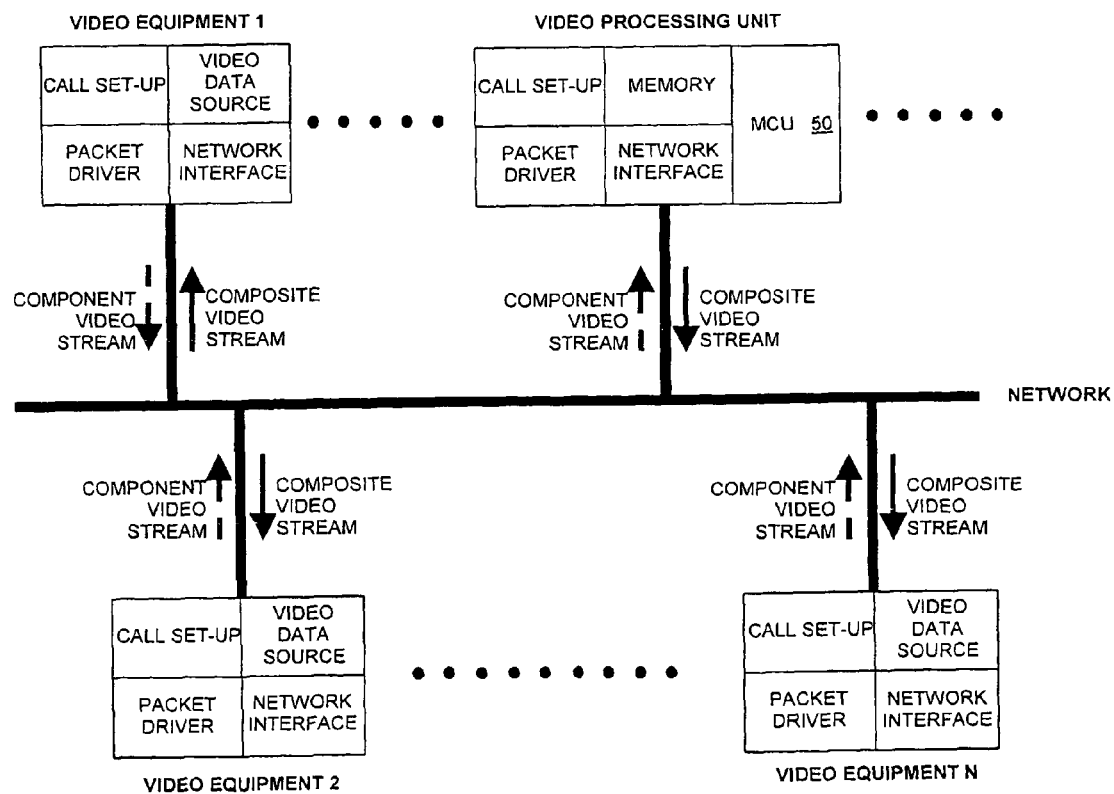
FIG. 7 is a diagram illustrating an exemplary implementation of the current invention in a network that involves multiple video terminals and that includes an MCU remote from the video terminals.
Figure 8:
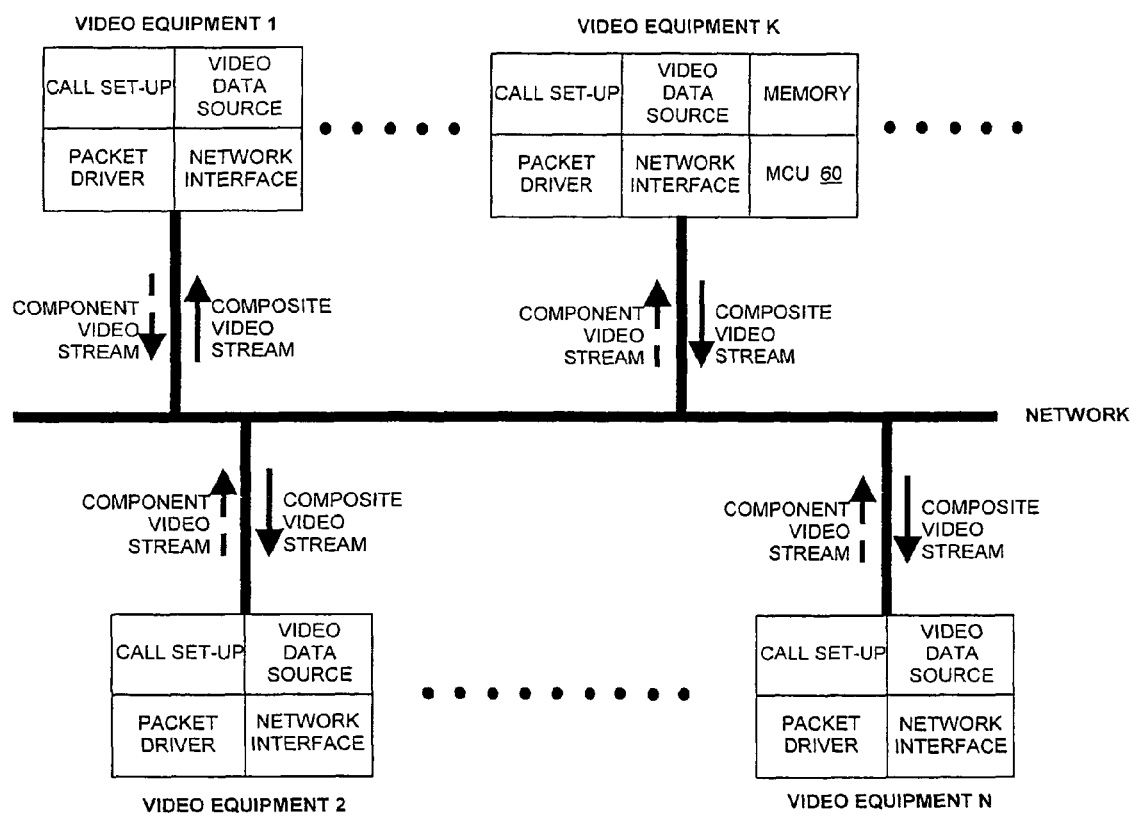
FIG. 8 is a diagram illustrating an exemplary implementation of the current invention in a network that involves multiple video terminals and that includes an MCU associated with one of the video terminals.

FIG. 7 presents an exemplary video conferencing system in accordance with the present invention. In this system, video streams are transmitted across a network among N video equipment via an MCU 50. The functions of call set-up program, video data source (camera, codec, etc.), packet driver and network interface hardware are well known in the art and will not be described in detail herein.

Unlike other MCU designs which need to reside on a separate server computer, under current invention an MCU 60 can, due to its low hardware and software demands, be easily incorporated in one of the video equipment K (FIG. 8) through software modifications. As earlier noted, one of the key reasons the MCU of the invention has low hardware and software demands is that the MCU works with the coded domain data and does not need to decode the coded domain data, in particular the pixel domain data contained in the coded domain data. The MCU of the invention may change headers in the coded domain data, and may rearrange the pixel domain data. The MCU of the invention ordinarily does not, however, decode the pixel domain data.

Figure 9:
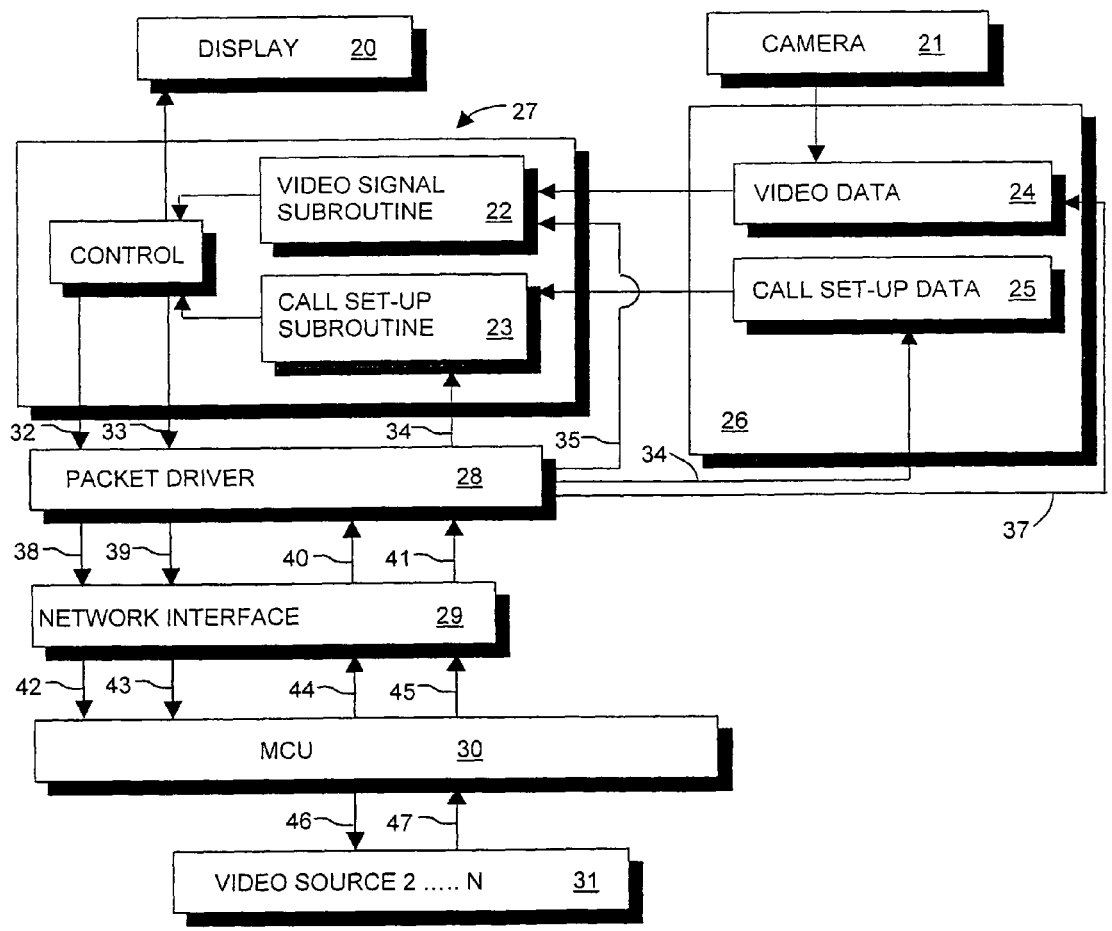
FIG. 9 is a diagram illustrating a video terminal constructed in accordance with the invention.

FIG. 9 illustrates a video data source and call set-up including a controller 27, memory 26, camera 21, and display 20. Also illustrated in FIG. 9 associated with said data source are the other video equipment packet driver 28 and network interface 29. The video data source transmits and receives data to and from MCU 30. Other equipment 31 is also in communication with MCU 30.

A packet driver, network interface, memory and call set-up are associated with MCU 30 in the manner illustrated in FIGS. 7 and 8.

Video data from camera is stored in memory as video data 24. The video data typically comprises a picture of one of the participants in the video conference. Controller 27 can direct the participant's CRT or other display 20 to show a picture of the participant.

During a video conference, the call set-up sub-routine 23 transmits call-initialization signals, including codec format data and other call-initialization data 32, to packet driver 28. Driver 28 assembles such data into packets and transmits the packets 38 to interface 29. Interface 29 transmits 42 the packet to MCU 30. The MCU 30 also transmits the packets 44, containing its call-initialization data, to network interface 29. Interface 29 transmits the call-initialization packets 40 to driver 28. Driver 28 disassembles the packet into a call-initialization signal 34 to call set-up data 25 in memory 26 and to call set-up sub-routine 23. Once this "hand shake" protocol exchange is successfully completed, controller 27 sends a video component signal 33 to packet driver 28. The video component signal 33 is produced by video signal sub-routine 22 using video data 24. Driver 28 assembles the video component signal 33 into a video component packet stream 39. Interface 29 transmits 43 the packet stream 39 to MCU 30. MCU 30 receives stream 43. The component packet stream 43 is disassembled by the packet driver associated with the MCU. The MCU 30 prepares a composite video signal in the manner earlier described. The packet driver associated with MCU 30 receives the composite video signal and prepares a composite video packet stream that is transmitted to the network interface associated with MCU 30. The network interface associated with MCU 30 transmits the composite video packet stream 45 to interface 29. Interface 29 transmits 41 the composite video packet stream 45 to packet driver 28. Driver 28 disassembles the packets in stream 41 to produce a composite video signal 37 to video data 24 and a composite video signal 35 to sub-routine 22. Signals 35 and 37 contain, for sake of this example, the same video data. Controller 27 causes the display picture on display 20 to be altered in accordance with the data received 41 in the composite video packet stream.

It should be noted that the current invention can be implemented using many various communication media, such as local area networks (LAN), mobile wireless communication networks, ISDN, cable/DSL, ATM networks and wired telephone networks. Also, as discussed earlier in this application, the video equipment used in such a system can be a mixture of personal computers, 2.5G/3G video mobile phone, notebook computers, PDA, game consoles, etc.

The invention claimed is:

1. A method for performing multipoint video conferencing comprising the steps of:
   (a) receiving a plurality of input signals each comprising a plurality of source pictures received from a plurality of source endpoints; and
   (b) transmitting composite pictures at a variable frame rate, wherein the transmission of each composite picture (a) is triggered by the receipt of a source picture from one or more of the source endpoints and (b) generated as soon as one of the plurality of source pictures is received, wherein said composite pictures represent composite images divided into image segments that (i) are associated with different ones of the source endpoints, (ii) contain the constituent images respectively represented by the source pictures from the source endpoints with which those image segments are associated, (iii) update only one image segment in each composite picture with the image respectively represented by the source picture from the associated source endpoint and (iv) all of the composite pictures comprise (A) only one coded portion per frame and (B) an indicator to not code associated with each of the image segments that are unchanged.

2. The method of claim 1 wherein the composite picture generated from a source picture of type INTRA is:
 (a) of picture type INTER; and
 (b) formed by converting, through appropriate header modification, the source picture macroblocks into converted macroblocks of a type selected from a pair consisting of INTRA and INTRA+Q and inserting said converted macroblocks into the image segment of the composite picture associated with the source endpoint from which said source picture is received.

3. The method according to claim 1, wherein said composite pictures comprise a video conference signal suitable for transmission over a computer network.

4. The method according to claim 3, wherein said video conference signal transmits new picture data for only one of said plurality of source pictures during any given transmission.

5. The method according to claim 3, wherein said video conference signal comprises a common intermediate format (CIF) picture stream.

6. The method according to claim 3, wherein said video conference signal is capable of being decoded by a decoder compliant with a particular video standard.

7. The method according to claim 3, wherein said frames of said conference video signal are generated at a rate that is not constant.

8. The method according to claim 3, wherein said frames of said conference video signal are generated at a frame rate greater than said frame rates of said plurality of input signals.

9. The method according to claim 3, wherein said method only presents a frame of said video conference signal in response to a new frame of one of said plurality of input video signals being received.

10. A multipoint control unit comprising:
 (a) a first apparatus for receiving a plurality of source pictures from a plurality of source endpoints; and
 (b) a second apparatus for transmitting composite pictures at a variable rate such that:
  (i) the transmission of each composite picture is triggered by the receipt of a source picture from one or more of the source endpoints; and
  (ii) said composite pictures represent composite images divided into image segments that:
   (A) are associated with different ones of the source endpoints;
   (B) contain the constituent images respectively represented by the source pictures from the source endpoints with which those image segments are associated;
   (C) update only one image segment in each composite picture with the image respectively represented by the source picture from the associated source endpoint; and
   (D) all of the composite pictures comprise (i) only one coded portion per frame and (ii) an indicator to not code associated with each of the image segments that are not changed.

11. The method according to claim 1, wherein (i) each of said plurality of source pictures is received from a respective one of a plurality of participants in a video conference and (ii) a video conference signal carrying said composite pictures is presented to each of said plurality of participants.

12. The method according to claim 1, wherein said source pictures comprise coded frames.

13. The method according to claim 1, wherein said method is implemented in a multi-point control unit.

14. The method according to claim 1, wherein each of said plurality of input signals operates at a different frame rate.

15. The method according to claim 10, wherein (i) each of said plurality of source pictures is received from a respective one of a plurality of participants in a video conference and (ii) a video conference signal carrying said composite pictures is presented to each of said plurality of participants.

16. The multipoint control unit of claim 10 wherein the composite picture generated from a source picture of type INTRA is:
 (a) of picture type INTER; and
 (b) formed by converting, through appropriate header modification, the source picture macroblocks into converted macroblocks of a type selected from a pair consisting of INTRA and INTRA+Q and inserting said converted macroblocks into the image segment of the composite picture associated with the source endpoint from which said source picture is received.

\* \* \* \* \*